United States Patent
Chiu

(10) Patent No.: US 7,596,394 B2
(45) Date of Patent: Sep. 29, 2009

(54) HANDHOLD WIRELESS DEVICE

(75) Inventor: Hsiu Hsiang Chiu, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 14 days.

(21) Appl. No.: 11/237,677

(22) Filed: Sep. 29, 2005

(65) Prior Publication Data

US 2006/0287011 A1    Dec. 21, 2006

(30) Foreign Application Priority Data

Jun. 21, 2005  (TW) ............................... 94120698 A

(51) Int. Cl.
*H04M 1/00* (2006.01)
(52) U.S. Cl. ................... 455/575.1; 455/90.3; 379/325; 379/329
(58) Field of Classification Search .............. 455/575.1, 455/575.2, 575.3, 575.4, 90.3, 128; 379/325, 379/329

See application file for complete search history.

(56) References Cited

U.S. PATENT DOCUMENTS

2004/0179342 A1* 9/2004 Pritchard et al. ............ 361/715
2005/0079902 A1* 4/2005 Chen et al. ................ 455/575.4
2005/0277449 A1* 12/2005 Wu ......................... 455/575.1
2007/0159778 A1* 7/2007 Lin et al. .................... 361/683

FOREIGN PATENT DOCUMENTS

JP          05065753 A    *  3/1993
JP          05278129 A    * 10/1993

* cited by examiner

*Primary Examiner*—CongVan Tran
(74) *Attorney, Agent, or Firm*—Muncy, Geissler, Olds & Lowe, PLLC

(57) ABSTRACT

The present invention relates to a handhold wireless device, comprising a main body and a hanging frame; wherein the two sides of the main body are each provided with a guiding trench having a first end and a second end and for allowing the hanging frame sliding between the two ends. When the frame is slid to the first end, the frame is accommodated in the trench, and when the frame is slid to the second end, the frame is extended out the main body for hanging.

When the frame is slid to the second end, the wireless device can be hung on a hanger. Alternatively, when the frame is at the second end, it can be rotated at an angle to be a supporter of the device to stand.

4 Claims, 7 Drawing Sheets

HANDHOLD WIRELESS DEVICE

This Non-provisional application claims priority under 35 U.S.C. §119(a) on Patent Application No(s). 094120698 filed in Taiwan, Republic of China on Jun. 21, 2005, the entire contents of which are thereby incorporated by reference.

FIELD OF THE INVENTION

The present invention relates to a handhold wireless device, particularly to a handhold wireless device which is capable of hanging on a wall and standing on a plane.

DESCRIPTION OF RELATED ART

With developing of remote control device, almost electronic apparatus such as television, video, stereo, and the like are controlled by using a wireless control device. Moreover, mobile phone is popular in the modern living. Such wireless devices are desired to be designed as thinner, lighter, and smaller as possible. Consequent, such wireless devices are not easy to find out after using since user always forgets where they put.

If there is any means on such wireless devices for hanging or standing, they would be hung on a wall or standing on a table or plane and thus can resolve the above problems.

SUMMARY OF THE INVENTION

The one object of the present invention is to provide a handhold wireless device, which is capable of hanging on a wall or a door knob by using a hanging frame provided on a main body.

The other object of the present invention is to provide a handhold wireless device, which is capable of standing on a plane by rotating a hanging frame in a certain angle.

To achieve the above objects, the present invention provides a handhold wireless device which comprises a main body and a hanging frame; wherein the two sides of the main body are each provided with a guiding trench having a first end and a second end and for allowing the hanging frame sliding between the two ends. When the frame is slid to the first end, the frame is accommodated in the trench, and when the frame is slid to the second end, the frame is extended out the main body for hanging. Thereby, when the hanging frame is positioned at the second end, the wireless device can be hung on a hanger and the frame can further be rotated at an angle to be a supporter of the device to stand.

According to the present handhold wireless device, the hanging frame is in a form of U-type and its two ends are each provided with a pivot which can slide in the trench.

According to the present handhold wireless device, the guiding trench is further provided with an extrusion rib along its wall for lodging the hanging frame in.

According to the present handhold wireless device, the pivot is further provided with a neck part for lodging with the extrusion rib.

According to the present handhold wireless device, the main body or the hanging frame or the both are partly provided with or made from a magnet for attaching on a metal surface.

According to the present handhold wireless device, the hanging frame can further be rotated in an angle to be a supporter for allowing the device standing when the hanging frame is slid to the second end.

BRIEF DESCRIPTION OF DRAWINGS

The present invention is illustrated more detail by reference to the accompanying drawings, wherein.

DETAILED DESCRIPTION OF THE INVENTION

The present invention is illustrated in more detail by reference the following embodiments which are only used for illustration without limiting the scope of the present invention.

Figure 1:
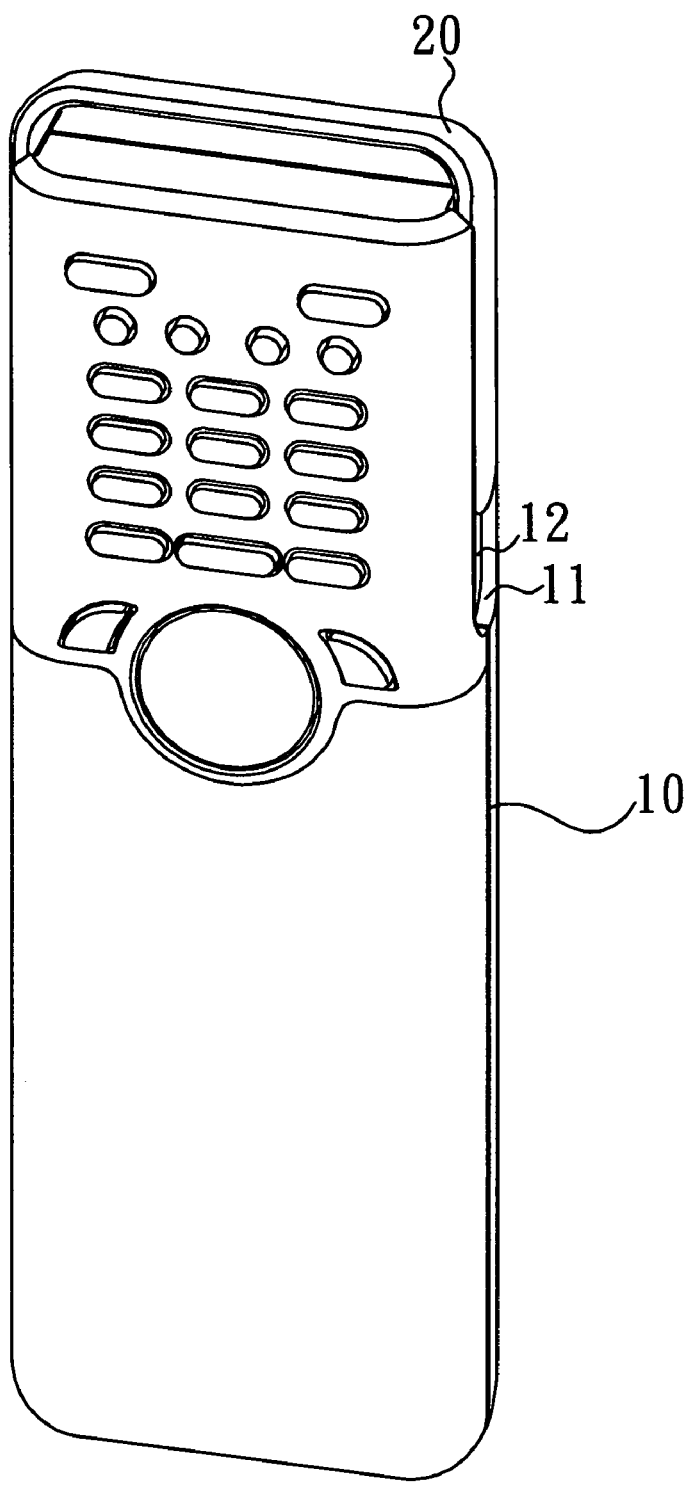
FIG. 1 is a schematic drawing of the handhold wireless device according to the present invention.
Figure 2:
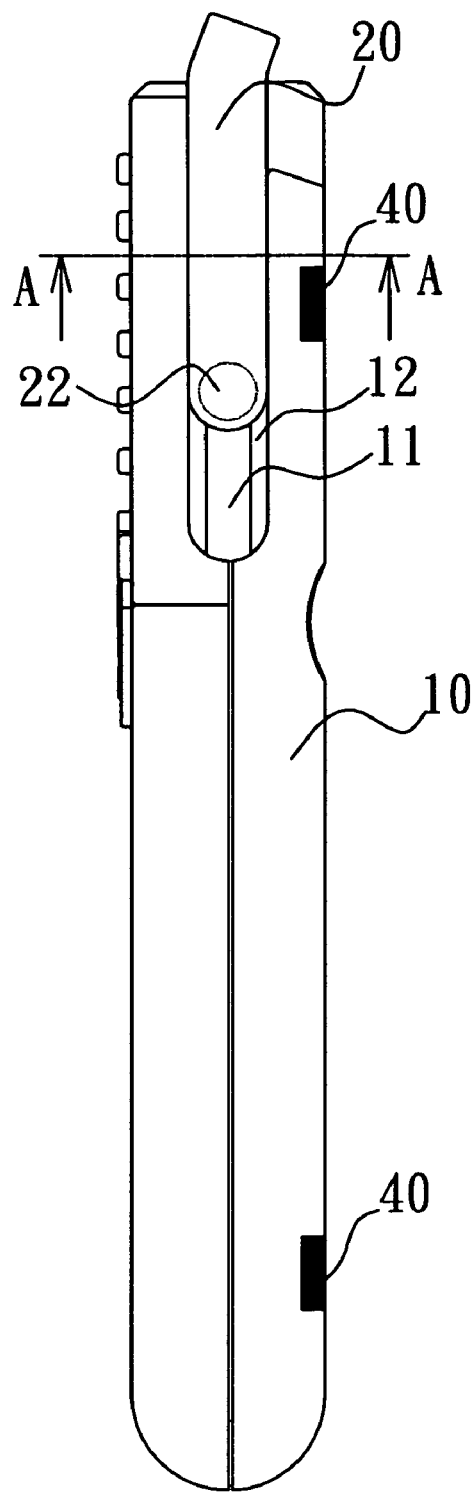
FIG. 2 is a side-viewing drawing of the present handhold wireless device in which the hanging frame is positioned at the first end of the trench.
Figure 3:
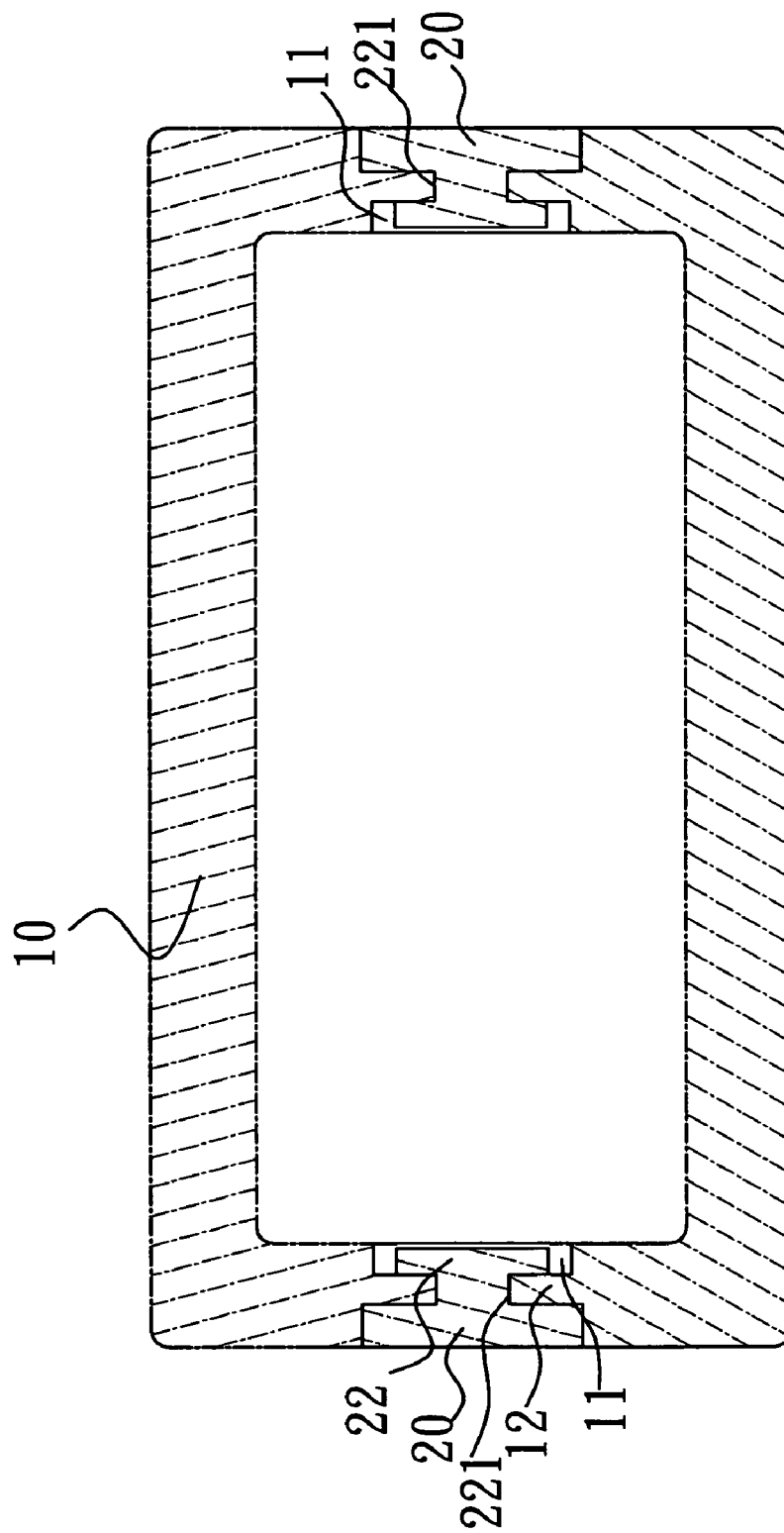
FIG. 3 is a section drawing of the handhold wireless device shown in FIG. 2 along the line A-A.

Please refer to FIGS. 1-3. FIG. 1 is a schematic drawing of the handhold wireless device according to the present invention. FIG. 2 is a side-viewing drawing of the present handhold wireless device in which the hanging frame is positioned at the first end of the trench. FIG. 3 is a section drawing of the handhold wireless device shown in FIG. 2 along the line A-A.

As shown in FIG. 1 and FIG. 2, the handhold wireless device according to the present invention comprises a main body 10 and a hanging frame 20; wherein the two sides of the main body 10 are each provided with a guiding trench 11 having a first end and a second end and for allowing the hanging frame 20 sliding between the two ends. In the guiding trench, there further provides with an extrusion rib 12 along its wall for lodging said hanging frame in (as shown in FIG. 3).

The hanging frame 20 is in a form of U-type and its two ends are each provided with a pivot 22 which can slide in the trench. Also, the pivot 22 is further provided with a neck part 221 for lodging with the extrusion rib 12.

Figure 4:
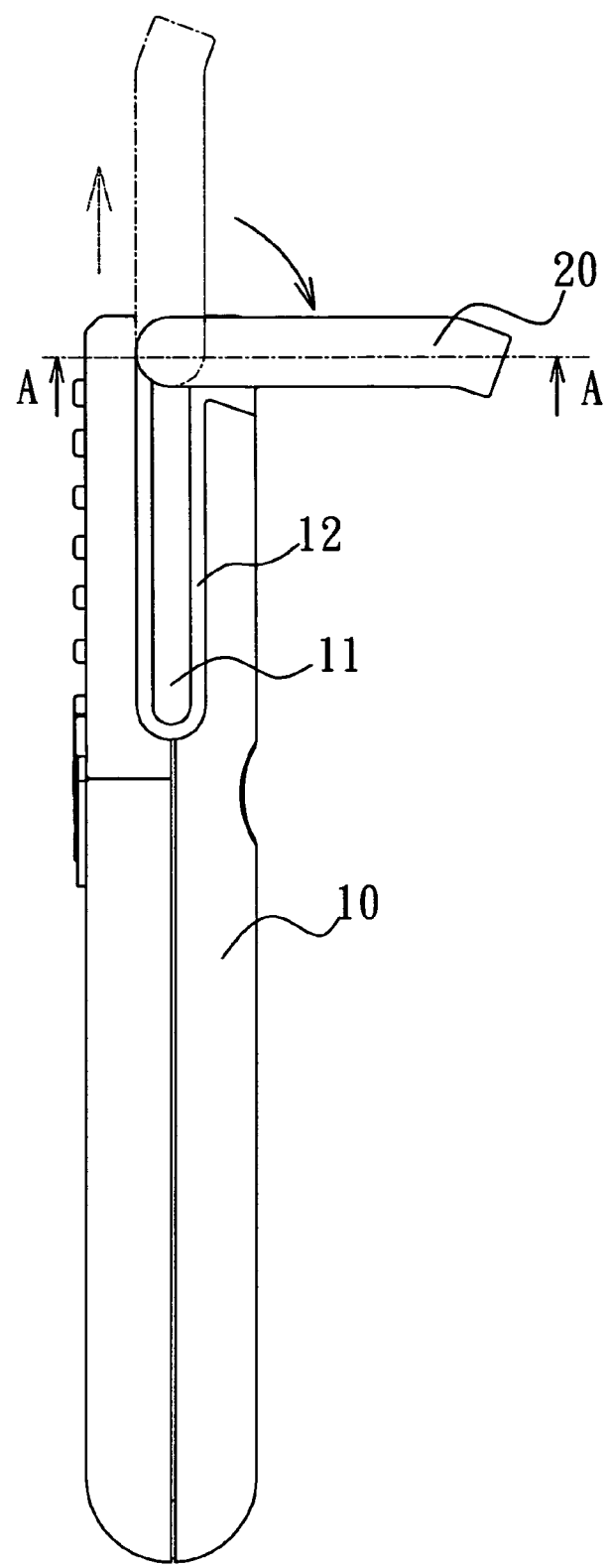
FIG. 4 is a side-viewing drawing of the present handhold wireless device in which the hanging frame is positioned at the second end of the trench.

When the frame 20 is slid to the first end, the frame is accommodated in the trench 11, as shown in FIG. 2, and when the frame 20 is slid to the second end, the frame 20 is extended out the main body 10 for hanging, as shown in the FIG. 4.

Figure 5:
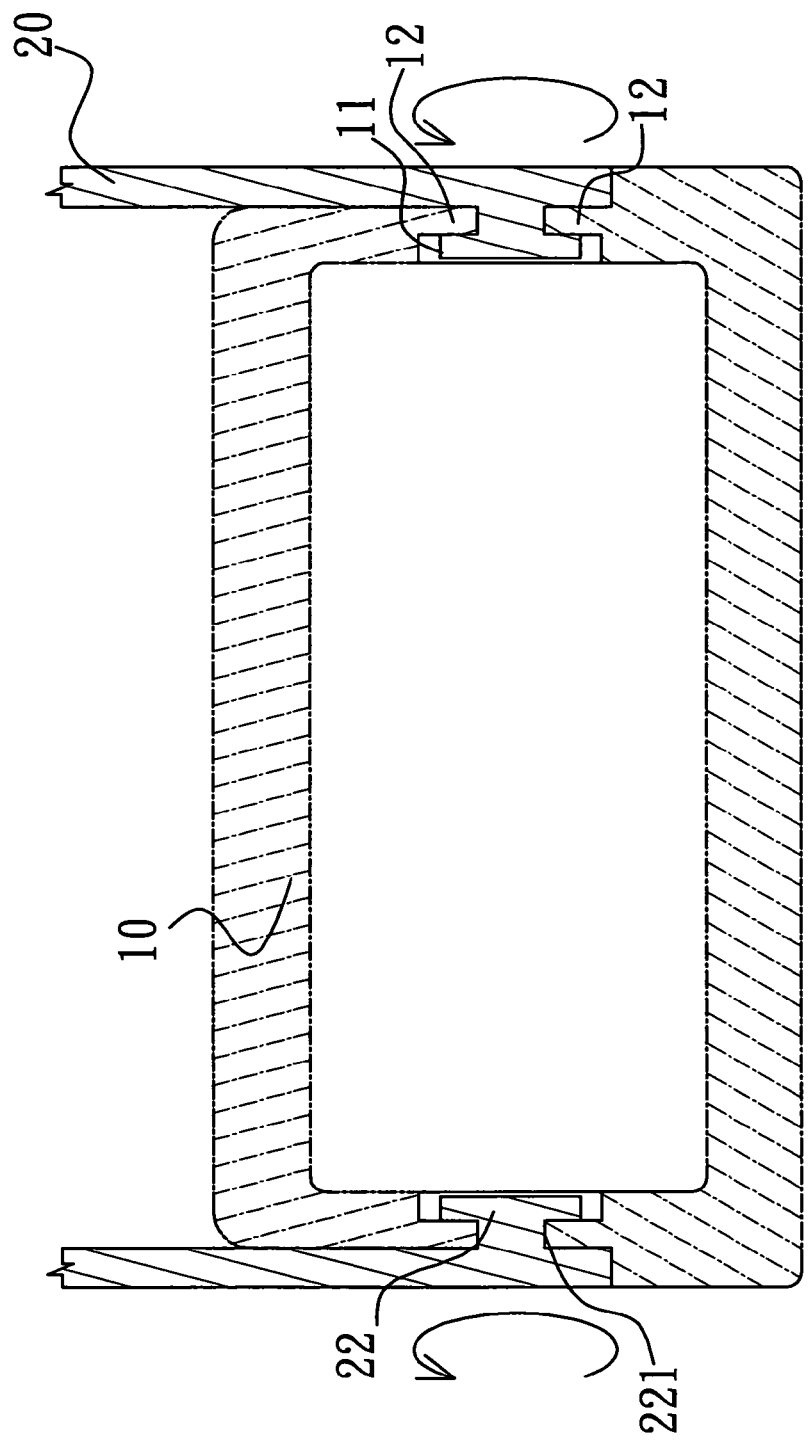
FIG. 5 is a section drawing of the handhold wireless device shown in FIG. 4 along the line A-A.
Figure 6:
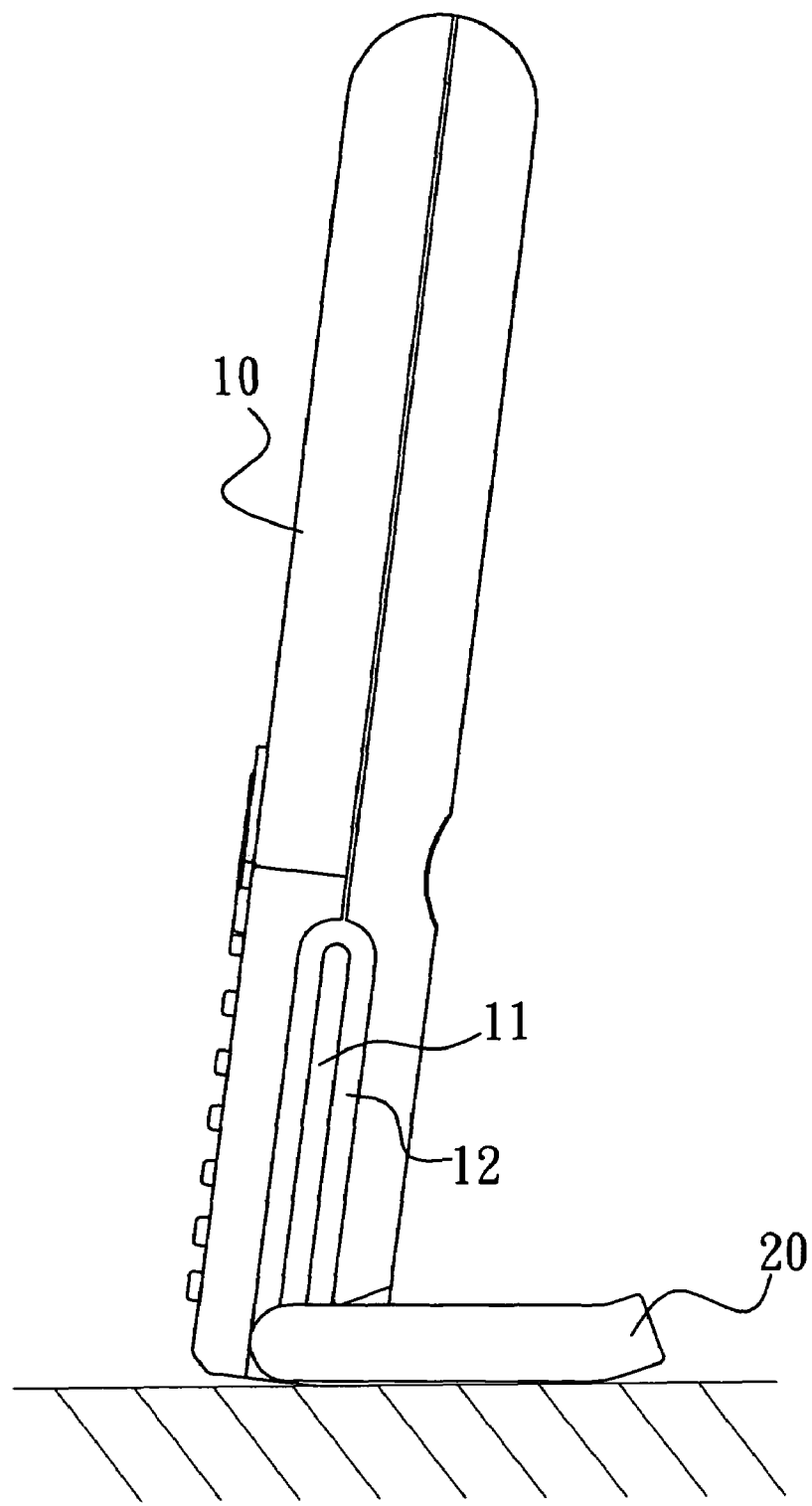
FIG. 6 is a side-viewing drawing of the present handhold wireless device in which the hanging frame stand on a plane.
Figure 7:
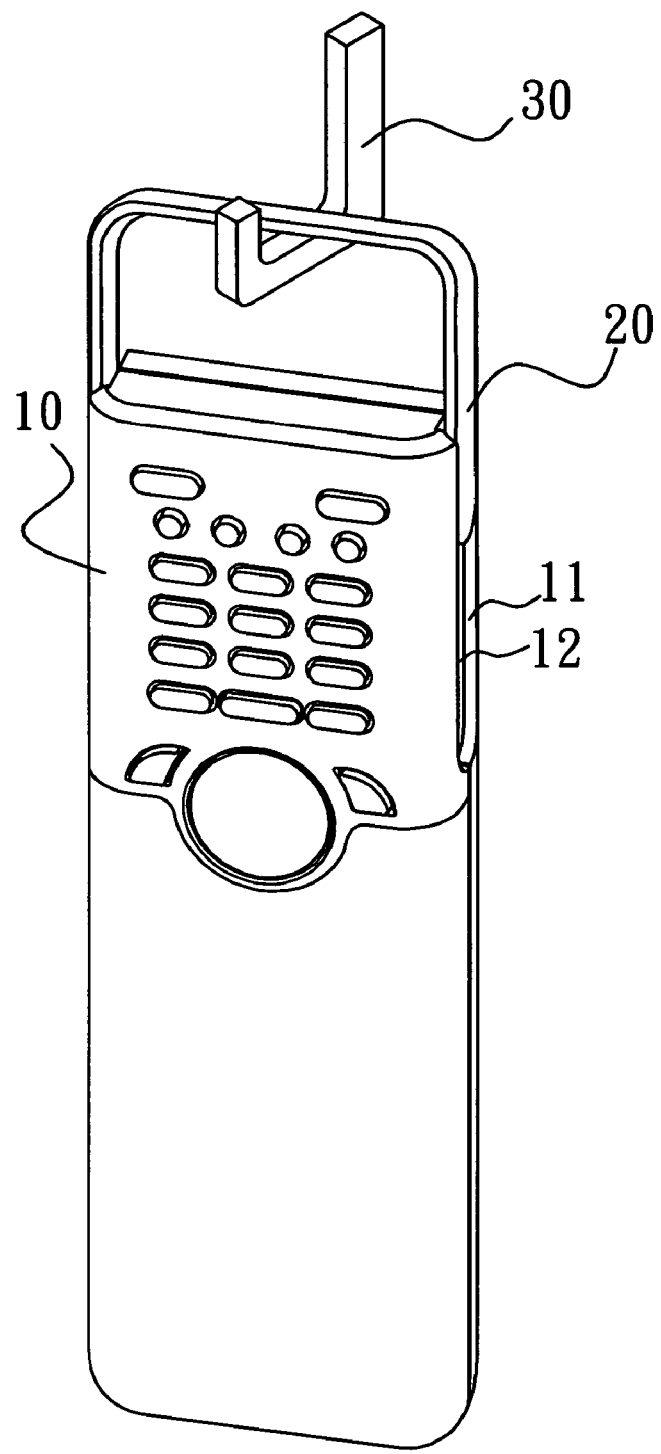
FIG. 7 is a schematic drawing of the present handhold wireless device in which the hanging frame is hung on a hanger.

Please also refer to FIGS. 4-7. FIG. 4 is a side-viewing drawing of the present handhold wireless device in which the hanging frame is positioned at the second end of the trench. FIG. 5 is a section drawing of the handhold wireless device shown in FIG. 4 along the line A-A. FIG. 6 is a side-viewing drawing of the present handhold wireless device in which the hanging frame stand on a plane. FIG. 7 is a schematic drawing of the present handhold wireless device in which the hanging frame is hung on a hanger.

According to the present invention, the handhold wireless device can be hung on a hanger 30 or a door knob through the use of the hanging frame 20 when the hanging frame 20 is slid to the second end of the trench 11, as shown in FIG. 7.

Alternatively, the hanging frame 20 can further be rotated in an angle to be a supporter of the main body 10 to stand on table or any plane.

Moreover, the main body 10 or the hanging frame 20 or the both are partly provided with or made from a magnet 40, as shown in FIG. 2, for attaching on a metal surface such on a refrigerator.

While the present invention has been particularly shown and described with reference to exemplary embodiments thereof, it will be understood by those of ordinary skill in the art that various changes and modifications may be made therein without departing from the spirit and scope of the present invention as defined by the following claims.

What is claimed is:

1. A handhold wireless device, comprising
a main body, the two sides of which are each provided with a guiding trench provided with an extrusion rib along its wall and having a first end and a second end; and
a hanging frame in a form of a U-shape and two ends of the frame are each provided with a pivot, the hanging frame being, slid between the first and the second ends by said pivots, wherein each of said pivots is provided with a neck part for lodging with the extrusion rib, wherein the frame is accommodated in the trench when it is slid to the first end, and the frame is extended out the main body for hanging when it is slid to the second end.

2. The handhold wireless device according to claim 1, wherein said hanging frame is rotated in an angle to be a supporter for allowing the device standing when said hanging frame is slid to the second end.

3. The handhold wireless device according to claim 1, wherein said main body is partly provided with or made from a magnet for attaching on a metal surface.

4. The handhold wireless device according to claim 1, wherein said hanging frame is partly provided with or made from a magnet for attaching on a metal surface.

* * * * *